(12) United States Patent
Takeuchi et al.

(10) Patent No.: US 8,480,932 B2
(45) Date of Patent: Jul. 9, 2013

(54) COMPOSITE OF METAL SULFIDE AND METAL OXIDE AND PROCESS FOR PRODUCING THE COMPOSITE

(75) Inventors: Tomonari Takeuchi, Ikeda (JP); Hikari Sakaebe, Ikeda (JP); Tetsuo Sakai, Ikeda (JP); Kuniaki Tatsumi, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 330 days.

(21) Appl. No.: 12/920,387

(22) PCT Filed: Mar. 6, 2009

(86) PCT No.: PCT/JP2009/054332
§ 371 (c)(1),
(2), (4) Date: Aug. 31, 2010

(87) PCT Pub. No.: WO2009/113460
PCT Pub. Date: Sep. 17, 2009

(65) Prior Publication Data
US 2011/0037037 A1    Feb. 17, 2011

(30) Foreign Application Priority Data
Mar. 12, 2008    (JP) .................................. 2008-062154

(51) Int. Cl.
*C01G 53/11*    (2006.01)
*C01G 3/12*    (2006.01)
*C01G 49/12*    (2006.01)
*H01M 4/36*    (2006.01)
*H01M 4/58*    (2010.01)

(52) U.S. Cl.
USPC .................................................... 252/519.12

(58) Field of Classification Search
USPC .................. 252/518.1, 519.12, 519.34, 521.2
See application file for complete search history.

(56) References Cited

U.S. PATENT DOCUMENTS 6,255,027 B1 * 7/2001 Wehelie et al. ................. 430/65

FOREIGN PATENT DOCUMENTS

JP    10-194748    *    7/1998
JP    10-194748 A       7/1998

(Continued)

OTHER PUBLICATIONS

International Search Report of PCT/JP2009/054332, mailing date Apr. 7, 2009.

(Continued)

*Primary Examiner* — Mark Kopec
*Assistant Examiner* — William Young
(74) *Attorney, Agent, or Firm* — Westerman, Hattori, Daniels & Adrian, LLP

(57) ABSTRACT

The present invention provides a process for producing a composite of metal sulfide and metal oxide obtained by dispersing a metal sulfide, which is nickel sulfide, copper sulfide, iron sulfide or a mixture thereof, in a metal salt-containing aqueous solution, and depositing metal salt on the metal sulfide by drying the aqueous solution; and heat-treating the metal sulfide comprising a metal salt deposited thereon at 400 to 900° C. in a sulfur-containing atmosphere. Also disclosed is a composite obtained by the aforementioned process, comprising a metal sulfide having a surface partially covered with a metal oxide. The composite of the present invention has improved cycle characteristics while maintaining a high charge/discharge capacity and excellent electrical conductivity inherently possessed by metal sulfide, which is usable as a material having a high theoretical capacity and excellent electrical conductivity when used as a positive-electrode material for a lithium secondary battery.

6 Claims, 6 Drawing Sheets

FOREIGN PATENT DOCUMENTS

| | | | |
|---|---|---|---|
| JP | 2002151078 | * | 5/2002 |
| JP | 2006-024415 A | | 1/2006 |
| JP | 2007-052935 A | | 3/2007 |
| KR | 2005030441 A | * | 3/2005 |
| WO | 2009/028326 A1 | | 3/2009 |

OTHER PUBLICATIONS

Kobayashi, Yo et al. "5 V Class All-Solid-State Composite Lithium Battery with Li3PO4 Coated LiNi0.5Mn1.5O4," Journal of Electrochemical Society, 2003, pp. A1577-A1582, vol. 150 (12).

Kobayashi, Yo et al. "High-Performance Genuine Lithium Polymer Battery Obtained by Fine-Ceramic-Electrolyte Coating of LiCoO2," Journal of the Electrochemical Society, 2005, pp. A1985-A1988, vol. 152 (1).

Kobayashi, Yo et al. "Development of high-voltage and high-capacity all-solid-state lithium secondary batteries," Journal of Power Sources, 2005, pp. 719-722, vol. 146.

Miyashiro, Hajime et al. "Improvement of Degradation at Elevated Temperature and at High State-of-Charge Storage by ZrO2 Coating on LiCoO2," Journal of the Electrochemical Society, 2006, pp. A348-A353, vol. 153 (2).

Uplane, M.M. et al. "Structural, optical, and electrochromic properties of nickel oxide thin films grown from electrodeposited nickel sulphide," Applied Surface Science, 2007, pp. 9365-9371, vol. 253.

Takeuchi, Tomonari et al. "Preparation of oxide-coated nickel sulfides and their electrochemical properties," The 49th Battery Symposium in Japan, Nov. 2008, pp. 394.

Takeuchi, Tomonari et al. "Tsuden Shoketsuho o Mochiita Sankabutsu Hifuku Ryuka-nickel no Sakusei to sono Denchi Tokusei," Abstracts of 2008 Autumn Meeting of Japan Society of Powder and Power Metallurgy, Nov. 2008, pp. 48.

Takeuchi, Tomonari et al. "Modification of Nickel Sulfide by Surface Coating with TiO2 and ZrO2 for Improvement of Cycle Capability," Journal of the Electrochemical Society, 2009, pp. A958-A966, vol. 156 (11).

\* cited by examiner

US 8,480,932 B2

COMPOSITE OF METAL SULFIDE AND METAL OXIDE AND PROCESS FOR PRODUCING THE COMPOSITE

TECHNICAL FIELD

The present invention relates to a composite of metal oxide and metal sulfide, a production process thereof and its use.

BACKGROUND ART

The development of various devices and systems in recent years has increased the demand for higher-performance batteries (primary batteries, secondary batteries, capacitors, etc.) as a power source. For example, lithium secondary batteries are gaining widespread popularity as high energy density secondary batteries serving as the power source for electronic devices such as portable communication devices, laptop computers, etc. Further, in terms of reducing environmental load, lithium secondary batteries are also expected to be used as batteries for driving the motors for vehicles. Accordingly, there is a demand for the development of high energy density lithium secondary batteries that will correspond to higher performance in the above devices. In order to meet this demand, increasing the capacities of both positive electrodes and negative electrodes is necessary.

However, the capacity of the positive electrode for currently available lithium secondary batteries has not increased as much as that of the negative electrode. For example, the specific capacity of lithium nickel oxide-based materials, which is said to be relatively high, is about 190 to 220 mAh/g. Even in the case of $Li_2MnO_3$-based materials, which contain a comparatively larger amount of lithium per formula weight, their theoretical capacity, based on the assumption that all of the lithium ions are used during charge and discharge, is merely about 460 mAh/g.

In contrast, although sulfur is a substance with a low operating voltage, the theoretical capacity thereof is as high as about 1,670 mAh/g. However, elemental sulfur has low electrical conductivity, and when it is used in a battery system that uses a currently available organic electrolyte (for example, an electrolyte obtained by dissolving 1 M of $LiPF_6$ in a mixed solution of ethylene carbonate and dimethyl carbonate (ethylene carbonate:dimethyl carbonate=1:1)), the sulfur reacts with lithium ions during the discharge of the battery system, and thereby dissolves into the electrolyte. Using metal sulfides ($MS_x$; M represents a metal component such as nickel, iron or copper), which have an electrical conductivity comparable to or higher than that of a semiconductor material and show relatively low dissolution into the electrolyte compared to sulfur, is one approach to overcoming these problems. A metal sulfide has a theoretical capacity of about 600 to 900 mAh/g; although this is lower than that of elemental sulfur, a higher capacity than the currently available oxide material is expected to be achieved.

However, positive electrodes of metal sulfides have a problem in regard to cycle performances. Therefore, in order to promote the use of metal sulfide as a positive electrode material, suppression of its cycle degradation is required. The main probable causes of cycle degradation are: (1) dissolution of sulfur components into the organic electrolyte, (2) electrochemical irreversibility of active materials, (3) separation of active materials from a current collector; etc. In terms of (1), in order to effectively suppress the dissolution of sulfur components, approaches from the standpoints of both electrolytes and active materials may be necessary. Some research from the standpoint of electrolytes has been conducted on organic electrolytes that can suppress the dissolution of sulfur components; however, approaches from the standpoint of the active materials, such as modifying the metal sulfide, have been almost entirely unreported.

There have been some reports (Non-Patent Documents 1-4 listed below) regarding all-solid-state lithium secondary batteries, which use sulfur-based solid electrolyte, wherein, in order to suppress the degradation caused by the oxide-based positive electrode active materials (e.g., $LiCoO_2$, $LiNi_{0.5}Mn_{1.5}O_4$) being directly in contact with the solid electrolyte, the surfaces of the active materials are covered with lithium phosphorate, oxide-based lithium ion conductive materials ($Li_{1.5}Al_{0.5}Ge_{1.5}(PO_4)_3$), zirconium oxide, etc. However, in batteries that use an organic electrolyte, an effective means for preventing the degradation of metal sulfide that is used as a positive electrode active material, in particular, means for suppressing the dissolution thereof into an organic electrolyte, has not been yet found.

Non-Patent Document 1: Y. Kobayashi, H. Miyashiro, K. Takei, H. Shigemura, M. Tabuchi, H. Kageyama, and T. Iwahori, J. Electrochem. Soc., 150, A1577 (2003).

Non-Patent Document 2: Y. Kobayashi, S. Seki, M. Tabuchi, H. Miyashiro, Y. Mita, and T. Iwahori, J. Electrochem. Soc., 152, A1985 (2005).

Non-Patent Document 3: Y. Kobayashi, S. Seki, A. Yamanaka, H. Miyashiro, Y. Mita, and T. Iwahori, J. Power Sources, 146, 719 (2005).

Non-Patent Document 4: H. Miyashiro, A. Yamanaka, M. Tabuchi, S. Seki, M. Nakayama, Y. Ohno, Y. Kobayashi, Y. Mita, A. Usami, and M. Wakihara, J. Electrochem. Soc., 153, A348 (2006).

DISCLOSURE OF THE INVENTION

Technical Problem

The present invention is made in view of the above-described conventional technical problems, and its main object is to provide a novel material having excellent properties with improved cycle performances, by effectively suppressing the dissolution of the sulfur component, into the organic electrolyte, of a metal sulfide that is usable as, for example, a high-capacity positive electrode active material for use in lithium secondary batteries.

Technical Solution

The present inventors conducted intensive studies in an attempt to achieve the above-described object. As a result, they found that a material comprising a metal sulfide having a surface partially covered with metal oxide can be obtained by adding a metal sulfide to an aqueous solution of a metal salt, mixing them, drying the mixture to deposit the metal salt on the surface of the metal sulfide, and conducting a heat treatment in a sulfur-containing atmosphere. In particular, when the metal sulfide comprising a metal salt deposited thereon is placed in a conductive container together with sulfur, and a heat treatment is conducted by applying pulsed direct current, a desired material can be efficiently produced in a relatively short period of time. The present inventors also found that the material thus obtained exhibits remarkably improved cycle performances and suppressed sulfur component dissolution compared to uncovered materials, because the surface of the metal sulfide is partially covered with metal oxide. The present invention has been completed by these findings.

More specifically, the present invention provides the composite of metal sulfide and metal oxide, production process thereof, and the use thereof described below.

Item 1. A composite of metal sulfide and metal oxide comprising:

a metal sulfide, which is nickel sulfide, copper sulfide, iron sulfide, or a mixture thereof; and a metal oxide that partially covers the surface of the metal sulfide.

Item 2. The composite according to Item 1, wherein the amount of the metal oxide is 0.01 to 0.5 mol per 1 mol of metal sulfide.

Item 3. The composite according to Item 1, wherein the metal oxide is a particulate titanium oxide.

Item 4. A process of producing a composite of metal sulfide and metal oxide of Item 1, comprising the step of:

dispersing a metal sulfide, which is nickel sulfide, copper sulfide, iron sulfide or a mixture thereof, in an aqueous solution containing a metal salt;

drying the aqueous solution to deposit the metal salt on the metal sulfide; and heat-treating the metal sulfide comprising metal salt deposited thereon at 400 to 900° C. in a sulfur-containing atmosphere.

Item 5. The process according to Item 4, wherein the metal sulfide comprising metal salt deposited thereon is heat-treated in a sulfur-containing atmosphere by placing the metal sulfide comprising metal salt deposited thereon in a conductive container together with sulfur, and then applying a pulsed direct current to the container in a non-oxidizing atmosphere.

Item 6. A lithium secondary battery positive-electrode material comprising the composite of Item 1.

Item 7. A lithium secondary battery comprising, as a constituent, a lithium secondary battery positive-electrode material comprising the composite of Item 1.

The composite of the present invention comprises a metal sulfide, which is nickel sulfide, copper sulfide, iron sulfide or a mixture thereof, and a metal oxide partially covering the surface of the metal sulfide.

The process of producing the composite material of the present invention, and the composite obtained by this process is explained in detail below.

(I) Process of Producing Composite of Metal Sulfide and Metal Oxide:

The composite of the present invention can be produced by a process comprising Step (1) and Step (2) below:

(1) dispersing a metal sulfide, which is nickel sulfide, copper sulfide, iron sulfide or a mixture thereof, in a metal salt-containing aqueous solution, and depositing metal salt on the metal sulfide by drying the aqueous solution; and (2) heat-treating the metal sulfide comprising a metal salt deposited thereon obtained in Step (1) at 400 to 900° C. in a sulfur-containing atmosphere.

The materials usable in Step (1) are explained below.

(i) Metal Sulfide

In the present invention, nickel sulfide, copper sulfide, iron sulfide or a mixture thereof is used as the metal sulfide. These metal sulfides have a high theoretical capacity and desirable electrical conductivity as a material for a positive electrode, and less dissolution to an electrolyte compared to elemental sulfur, exhibiting excellent ability as positive electrode active materials for use in lithium secondary batteries.

There is no particular limitation to the compositions of the aforementioned metal sulfides. Preferably used is a metal sulfide represented by a composition formula $M^1S_x$ (wherein $M^1$ is at least one member selected from the group consisting of Ni, Cu and Fe, and $0<x\leq2$). Among these possible metal sulfides, metal sulfides having a high sulfur content, i.e., $1<x\leq2$ in $M^1S_x$, are particularly preferable for use as positive-electrode materials because they have a high theoretical capacity and desirable electrical conductivity. Furthermore, taking the elimination of sulfur in the heat treatment step described later into consideration, the use of a sulfide having a high sulfur content as a raw material is preferable.

There is no particular limitation to the form of the metal sulfide; however, a preferable form thereof is a powder having a mean particle diameter of about 0.1 to 100 μm.

There is no particular limitation to the method for producing the aforementioned metal sulfide, and various known methods may be employed. In one particularly preferable production method, a porous metal and sulfur are placed in a conductive container, and pulsed direct current is applied to the container in a non-oxidizing atmosphere to allow the porous metal to react with the sulfur (this method is referred to as an electric current sintering method). This method makes it possible to efficiently produce a target metal sulfide in a relatively short period of time. This method is explained in detail below.

(ii) Production of Metal Sulfide by Electric Current Sintering Method

In this method, porous metal and sulfur are used as raw materials. It is preferable that the porous metal is selected from Ni, Cu, Fe or an alloy thereof. The porous metal is preferably a porous body having a porosity of about 80% or higher. When a porous body having a high porosity is used as a raw material, the contact area of the metal with sulfur vapor is large during the reaction, promoting the sulfurization of the metal and allowing many sulfur atoms to be easily incorporated into the resulting metal sulfide. Thus, a sulfide with a high proportion of sulfur atoms can be easily produced. When the porosity is less than 80%, the reaction with sulfur does not satisfactorily progress, and a metal sulfide having a high sulfur atomic ratio cannot be easily produced; thus, such a porous body is not preferable. The upper limit of the porosity is not particularly limited, and about 99% or below is normally preferable.

There is no particular limitation to the shape of the porous metal; however, in order to allow a conductive network to be formed around the porous metal, which is contained in a conductive container, and to allow the porous metal to be uniformly heated, every piece of porous metal preferably has a shape that allows an electrical connection to the conductive container in at least two portions. For example, even when the porous metal is in a powder or granular form, a conductive network can be formed in the conductive container by placing the porous metal in the container such that there is sufficient contact between each piece of porous metal. Particularly, when the porous metal has a plate-like shape that is substantially congruent with the cross-sectional shape of the conductive container, sufficient contact between the conductive container and the porous metal can be ensured. The use of a porous metal having such a shape allows a conductive network to be sufficiently formed around the porous metal, which is placed in the container, thereby allowing the temperature distribution in the container to be uniform.

The iron used as the raw material is not limited to porous iron such as sponge-like iron, and various forms of metal iron such as granular iron, powder iron, fibrous iron and the like may be used.

There is no particular limitation to the shape of sulfur used as a raw material; however, it is usually preferable to use powdered sulfur having a mean particle diameter of about 1 to 300 μm. Note that, in the present specification, the mean particle diameter is the particle diameter at which the cumulative population in particle diameter distribution is 50% when the particle diameter distribution is measured by the dry-type laser diffraction and scattering method.

There is no particular limitation to the ratio of the porous metal to sulfur; however, because it is usually difficult to make the entire amount of sulfur used as a raw material to completely react with a porous metal, the present invention preferably uses sulfur in a molar ratio that exceeds the molar ratio of sulfur in the target metal sulfide. For example, in the case of the production of a metal sulfide: $MS_2$, it is preferable to use as a raw material at least 2 mol of sulfur per 1 mol of porous metal. There is no particular upper limit to the proportion of sulfur. For example, about 100 mol of sulfur per 1 mol of porous metal can be used. Further, when only a small amount of sulfur is contained in a metal sulfide by one reaction, the same reaction may be repeated with further adding sulfur to the product, thereby obtaining a metal sulfide with a high proportion of sulfur atoms. In the case of repeating the reaction, the porous metal sulfide produced by the first reaction may be used in the resulting shape as is, or the porous metal sulfide may be crushed before being used in second and subsequent reactions. When the metal sulfide is crushed, the size thereof is reduced, thus generally further improving its reactivity with sulfur, and $MS_2$ can be produced with a smaller amount of sulfur and fewer repetitions of the reaction.

In the production process of a metal sulfide by an electric current sintering method, raw materials comprising a porous metal and sulfur are placed in a conductive container, and a pulsed direct current is applied to the conductive container. Accordingly, the conductive container is heated by joule heating, and the raw materials in the container are heated, thereby causing the reaction between the porous metal and sulfur, and resulting in the formation of a metal sulfide.

There is no limitation to the material of the conductive container. Any material is acceptable insofar as it has a sufficient electrical conductivity and a heat resistance that withstands the heating temperature when a pulsed direct current is applied to the container, it is composed of components that do not produce any by-products by reacting with sulfur, and it has sufficient strength. For example, carbon (such as graphite), tungsten carbide, and the like may be suitably used.

The reaction between a porous metal and sulfur is carried out in a non-oxidizing atmosphere, for example, in an inert gas atmosphere such as Ar or $N_2$, or in a reducing atmosphere such as $H_2$. Accordingly, the risk of sulfur ignition can be eliminated.

When a container capable of providing sufficient hermetic sealing is used as a conductive container, a non-oxidizing atmosphere can be established simply by making the inside the conductive container to be a non-oxidizing atmosphere.

Further, the conductive container does not need to be completely hermetically sealed. Insofar as the conductive container can be closed to a degree that can prevent the leakage of evaporated sulfur, inert gas or the like may be leaked out through the container to some degree. When a conductive container that is not completely hermetically sealed is used, the container may be placed in a reaction chamber having a non-oxidizing atmosphere, such as an inert gas atmosphere and a reducing atmosphere, inside thereof. This makes it possible to carry out the reaction between porous metal and sulfur in a non-oxidizing atmosphere. In this case, the leakage of the evaporated sulfur from the conductive container can be efficiently suppressed by making the inside the reaction chamber an inert gas atmosphere, a reducing atmosphere or the like having a pressure of 0.1 MPa or greater.

As described above, the leakage of molten and evaporated sulfur from the container is prevented by employing a process in which raw materials comprising porous metal and sulfur are placed in a conductive container, and a pulsed direct current is applied to the container. Accordingly, the loss of sulfur due to evaporation is reduced, and a metal sulfide with a high proportion of sulfur atoms can be efficiently produced.

FIG. 1 is a schematic view showing an example of an apparatus for electric current application treatment used in the electric current sintering method described above.

The apparatus 1 for electric current application treatment shown in FIG. 1 has a die (conductive container) 3 containing raw materials 2 and an upper and lower pair of spacers (cover members of the container) 4 and 5. The spacers (cover members) 4 and 5 are supported by punch electrodes 6 and 7, respectively, and pressed by the punch electrodes 6 and 7 at a pressure of, for example, about 1 MPa against the die 3. Accordingly, the conductive container comprising the die 3 and the spacers 4 and 5 becomes hermetically sealed, and is thereby capable of preventing the leakage of the evaporated sulfur during heating.

The spacers (cover members) 4 and 5 are composed of conductive components, and a pulsed direct current generated from a pulse current supply 11 is supplied to the spacers (cover members) 4 and 5 and the die (conductive container) 3 via the punch electrodes 6 and 7. A current-carrying unit comprising the die 3, the spacers 4 and 5, and the punch electrodes 6 and 7 is placed in a water-cooled vacuum chamber 8, and the inside of the chamber is controlled to a predetermined non-oxidizing atmosphere by an atmosphere control mechanism 15. This enables the reaction to be carried out in a non-oxidizing atmosphere. Using the apparatus shown in FIG. 1, sulfur is volatized when the vicinity of the sample is heated; however, because the top and bottom of the mold (conductive container) 3 are covered by the spacers (cover members) 4 and 5, the loss of sulfur due to the evaporation and leakage to outside the mold is small, and the reaction therefore proceeds efficiently.

A control unit 12 drives and controls a pressurizing mechanism 13, the pulse current supply 11, the atmosphere control mechanism 15, water cooling mechanisms 16 and 10, and a temperature measuring device 17. The control unit 12 is configured to drive the pressurizing mechanism 13 so that the punch electrodes 6 and 7 compress the spacers 4 and 5 with a predetermined amount of pressure.

There is no particular limitation to the method of placing raw materials comprising porous metal and sulfur in the conductive container; however, it is preferable to place them in the container in such a manner that electrical conductivity is ensured between every piece of porous metal and the conductive container so that a conductive network is formed around the metal component. There is no particular limitation to the method of placing sulfur in the container; however, it is preferable to place the sulfur as uniformly as possible in order to facilitate the uniform progress of the reaction.

According to the method described above, a pulsed direct current is applied to the conductive container containing porous metal and sulfur so that the conductive container is consequently heated by joule heating; the raw materials thereby being heated. As a result, a portion of the sulfur (the melting point is about 120° C.), which is a raw material, is evaporated and attached to the surface of the metal sample. Here, a reaction occurs to produce a metal sulfide. The reaction proceeds while the evaporated sulfur is further attached to the sample surface. These processes occur sequentially, obtaining a desired metal sulfide.

The temperature of the conductive container heated by applying a pulsed direct current may be suitably selected according to the type and shape of the metal used as a raw material, the type of product, and the like, and it may be usually about 300° C. to 800° C. At temperatures below 300° C., there are cases where the reaction between the metal and sulfur that are used as raw materials is insufficient; and at temperatures of 800° C. or higher, decomposition may occur due to the elimination of sulfur from the product. Heating at temperatures of about 400° C. to 700° C. is particularly preferable.

A pulsed ON-OFF direct current having a pulse width of about 2 to 3 milliseconds and a frequency of about 3 Hz to 300 Hz may be used as the pulse current applied for heating. The current value varies depending on the type and size of the conductive container; however, about 300 A to 1,000 A is preferable when, for example, a graphite container having an inner diameter of 15 mm and an outer diameter of 30 mm is used. During the reaction, input electric energy (Wh value) or the current value may be desirably controlled by increasing or decreasing the current value while monitoring the temperature of the conductive container, so as to maintain a predetermined temperature.

The heating time by applying an electric current cannot be generalized as it varies depending on the amount of sample used, the reaction temperature and the like. For example, maintaining the temperature within the heating temperature range described above for about 1 minute to 2 hours is sufficient.

After applying an electric current at a predetermined temperature, the sample is cooled and then taken out from the conductive container. Thereby, a metal sulfide is obtained. Further, by simply crushing the resulting metal sulfide in a mortar or the like, powdered metal sulfide can be obtained. When the reaction is not fully completed or when the amount of sulfur in the product is insufficient, the above-described treatment by applying an electric current may be repeated again after adding sulfur to the obtained sample.

The resulting metal sulfide still has substantially the same shape as the porous metal used as the starting material; i.e., a porous metal sulfide having a porosity of about 80% or higher can be obtained.

(iii) Metal Salt

There is no particular limitation to a metal salt used as a starting material in the process for production of the composite according to the present invention. However, a preferable example of the metal salt meets the following requirements. The metal salt is preferably a water-soluble metal salt whose aqueous solution does not react with metal sulfide; is converted to a metal oxide when subjected to a heat treatment at about 400 to 900° C., preferably at 500 to 800° C.; and the resulting metal oxide does not deteriorate the electrolyte when comes into contact therewith.

Examples of such metal salts include salts of Ti, Si, Ca, Mg, etc. Preferable examples thereof are sulfate, nitrate and acetate that contain oxygen so that they form an oxide when decompose in a non-oxidizing atmosphere.

(iv) Details of Step (1) Described Above

In Step (1) above, metal sulfide is first dispersed in a metal salt-containing aqueous solution. There is no limitation to the concentration of the metal salt in the aqueous solution, which may be suitably selected depending on the type of the metal salt used so that the metal salt completely dissolves. For example, an aqueous solution having a metal salt concentration of about 0.01 to 50 weight % may be used.

There is no particular limitation to the amount of the metal sulfide added to the metal salt-containing aqueous solution, as long as it can be uniformly dispersed in the aqueous solution. However, when the amount of metal oxide to be produced in Step (2) described later becomes too large, the metal oxide covers an undesirably large portion of the surface of the metal sulfide. This hinders the extraction and insertion of Li during the charge and discharge of the battery, respectively; and, if the metal oxide is highly insulative, the electrical conductivity of the active materials will be lowered. In order to avoid such problems, the ratio of the metal salt to the metal sulfide is preferably such that the amount of metal oxide formed from the metal salt is preferably not greater than 0.5 mol, and more preferably about 0.01 to 0.5 mol per 1 mol of metal sulfide added to the aqueous solution.

After adding metal sulfide to a metal salt-containing aqueous solution, the aqueous solution is sufficiently stirred, and the aqueous solution is then dried so as to deposit the metal salt on the surface of the metal sulfide.

There is no particular limitation to the temperature of the aqueous solution while stirring; therefore, stirring may be conducted at an ordinary (room) temperature. There is also no particular limitation to the stirring time, as long as the added metal sulfide can be uniformly dispersed.

The temperature of the aqueous solution is not particularly limited when dried, and the drying may be conducted at an arbitrary solution temperature selected from ordinary temperature to under heating. Taking the efficiency in drying into consideration, heating the solution to 70 to 120° C. is generally preferable.

The aforementioned steps may be conducted in air.

(v) Details of Step (2) Described Above

The metal sulfide comprising metal salt deposited on the surface thereof that was obtained in Step (1) is heated at 400 to 900° C. in a sulfur-containing atmosphere. In this step, the metal salt is oxidized to form a metal oxide, and the surface of the metal sulfide is partially covered with the metal oxide thus formed.

The specific treatment method employed in this step is not particularly limited. One example of a possible method is such that metal sulfide having metal salt deposited on its surface is placed in a heat-resistant airtight container together with sulfur powder, the inside of the container is adjusted to an inert gas atmosphere, reducing atmosphere or like non-oxidizing atmosphere, and then the container is heated in a heating furnace. This makes the inside of the heating furnace a sulfur-containing atmosphere, and prevents the elimination of sulfur atoms from the metal sulfide, obtaining a composite having excellent properties.

In the present invention, it is particularly preferable that Step (2) be conducted in such a manner that the metal sulfide, comprising metal salt deposited thereon, and sulfur are placed in a conductive container; and heat treatment is then conducted by applying a pulsed direct current to the container in a non-oxidizing atmosphere. Accordingly, the conductive container is heated by joule heating, the starting materials in the container are heated, and the metal salt decomposes to form a metal oxide in the sulfur-containing atmosphere, resulting in the formation of a composite comprising a metal sulfide whose surface is partially covered with metal oxide. This method allows the effective production of a target composite by employing a relatively simple technique of electric current sintering.

There is no limitation to the form of the sulfur used in the aforementioned electric current sintering; however, the use of powder sulfur having a mean particle diameter of about 1 to 300 μm is usually preferable.

There is no particular limitation to the ratio of sulfur to the metal sulfide comprising metal salt deposited thereon; however, it is preferable that the amount of sulfur be about 1 to 20 times that of the metal sulfide in molar ratio.

The types of the conductive container used in the aforementioned electric current sintering method and the method for making the inside of the conductive container a non-oxidizing atmosphere may be the same as those used in the electric current sintering method employed in obtaining the metal sulfide described earlier. As in the production of the metal sulfide, an apparatus having the structure shown in FIG. 1 may also be used as the apparatus for electric current application treatment used in electric current sintering.

There is no particular limitation to the method for placing the starting materials comprising metal sulfide having metal salt deposited thereon and sulfur in a conductive container; however, it is preferable that the starting materials be placed as uniformly as possible so that the reaction proceeds uniformly.

According to the electric current sintering method, a pulsed direct current is applied to the conductive container containing sulfur and a metal sulfide comprising metal salt deposited thereon, and the conductive container is consequently heated by joule heating, so that the starting materials are heated. As a result, a portion of the sulfur (the melting point is about 120° C.), which is a starting material, is evaporated. This makes the inside of the container a sulfur-containing atmosphere; therefore, while the elimination of sulfur from the metal sulfide is reduced, the metal salt deposited on the surface of the metal sulfide decomposes by heat to form a metal oxide, producing metal sulfide having metal oxide attached to the surface thereof.

The temperature of the conductive container heated by applying pulsed direct current may be suitably selected depending on the types of the metal salt used as a starting material, its decomposition temperature, the types of the metal sulfide, and the like; however, the temperature of the conductive container is usually about 400 to 900° C. If the temperature of the conductive container is lower than 400° C., thermal decomposition of the metal salt (i.e., the starting material) becomes insufficient, and metal oxide may not be formed. Having a temperature of the conductive container of 900° C. or higher is not preferable, because decomposition due to the sulfur elimination from the metal sulfide tends to easily occur. Heating the conductive container to about 500 to 800° C. is particularly preferable.

A pulsed ON-OFF direct current, for example, having a pulse width of about 2 to 3 milliseconds and a frequency of about 3 Hz to 300 Hz may be used as a pulse current applied for heating. The current value varies depending on the type and size of the conductive container; however, about 300 A to 1,500 A is preferable when, for example, a graphite container having an inner diameter of 15 mm and an outer diameter of 30 mm is used. During the reaction, input electric energy (Wh value) or the current value may be desirably controlled by increasing or decreasing the current value while monitoring the temperature of the conductive container, so as to maintain a predetermined temperature.

The heating time by applying an electric current cannot be generalized as it varies depending on the amount of sample used, the reaction temperature and the like. For example, maintaining the temperature within the heating temperature range described above for about 1 minute to 2 hours is sufficient.

After applying an electric current at a predetermined temperature, the sample is cooled and then taken out from the conductive container, obtaining a composite of metal sulfide and metal oxide, wherein the surface of the metal sulfide is partially covered with metal oxide. When treating a large amount of starting materials, a large conductive container may be used to increase the scale of the above-described process.

(II) Composite of Metal Sulfide and Metal Oxide

The aforementioned method makes it possible to obtain a composite of metal sulfide and metal oxide, wherein the surface of the metal sulfide is partially covered with metal oxide. In the composite, the surface of metal sulfide is partially covered with metal oxide. When the surface of metal sulfide is partially covered with metal oxide, the extraction/insertion of Li will not be largely inhibited during charge and discharge of batteries, allowing the obtainment of satisfactory charge/discharge capacity. Furthermore, because a portion of metal sulfide having excellent electrical conductivity is exposed, satisfactory electrical conductivity can be reliably obtained. Because a portion of metal sulfide is covered with metal oxide, dissolution of sulfur component is suppressed and excellent cycle performances can be achieved.

In the method described above, a heat treatment is conducted in a sulfur-containing atmosphere, and elimination of sulfur from metal sulfide is reduced; however, elimination of sulfur atoms from metal sulfide, which is a starting material, may occur to a certain extent depending on the treatment conditions. The metal sulfide contained in the target composite has a sulfur content of about 30 to 100% relative to that of the metal sulfide used as the starting material.

One preferable example of the metal sulfide, which is one component of the composite produced by the aforementioned method is that represented by formula: $M^1S_x$, wherein x falls within the range of about $0<x\leq1.5$, and particularly preferably within the range of about $0<x\leq1.0$.

In order to obtain excellent properties as a positive electrode material, the amount of the metal oxide covering the surface of the metal sulfide is preferably about 0.01 to 0.5 mol, and more preferably about 0.02 to 0.4 mol, relative to one mol of metal sulfide.

There is no particular limitation to the proportion of the surface of the metal sulfide covered with metal oxide; however, it may be about 1 to 50%, and preferably about 3 to 40%.

The metal oxide covering the metal sulfide may be in a particulate form having a mean particle diameter of about 50 to 300 nm; however, the form of the metal oxide is not limited thereto.

A composite of metal sulfide and metal oxide obtained by the method of the present invention can be effectively used as a positive-electrode active material for a lithium secondary battery. A lithium secondary battery that uses the composite can be produced by known techniques. Specifically, besides using the composite obtained by the process of the present invention as a positive-electrode material, a lithium secondary battery may be assembled in accordance with conventional procedures using known materials. More specifically, metal lithium, carbon-based material (activated carbon, graphite) or the like can be used as a negative-electrode material; a known solution in which lithium perchlorate, $LiPF_6$ or like lithium salt is dissolved in ethylene carbonate, dimethyl carbonate or like solvent can be used as an electrolyte; and other known battery components may be used. When a material that does not contain Li, such as carbon-based material, is used for a negative electrode, Li must be inserted in the material in advance by pre-doping or the like.

Effect of the Invention

The composite of metal sulfide and metal oxide according to the present invention exhibits improved cycle performances while maintaining the high charge/discharge capacity and excellent electrical conductivity inherently possessed by metal sulfide.

Accordingly, the composite of the present invention can be used as a material that exhibits a high theoretical capacity and excellent cycle performances when used, for example, as a positive electrode material for a lithium secondary battery.

Furthermore, the production process of the present invention allows the obtainment of a positive electrode material having such excellent properties in a relatively simple and efficient manner.

EXPLANATION OF THE REFERENCE NUMERALS

Figure 1:
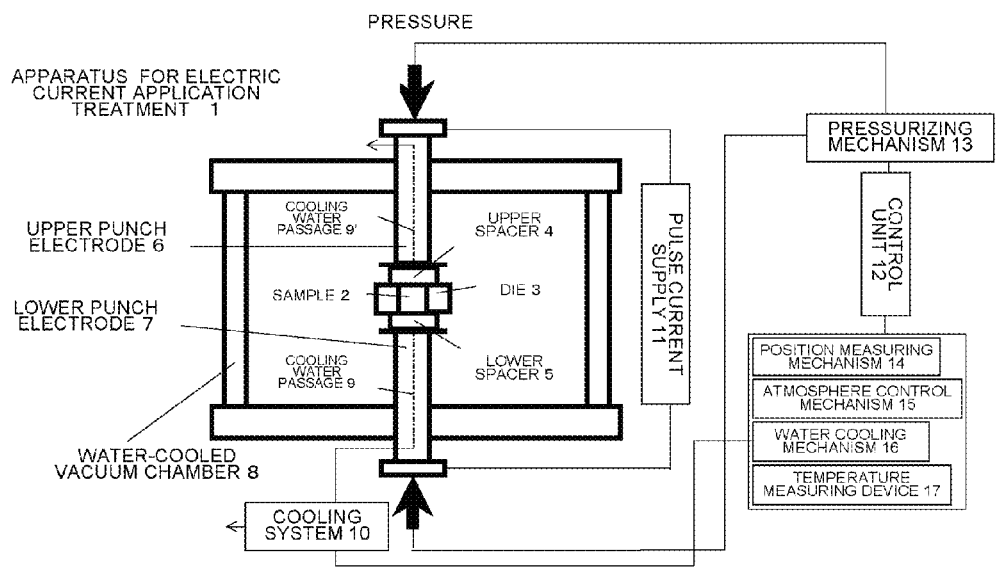
FIG. 1 shows a schematic view of an example of an apparatus for electric current application treatment used in the process of the present invention.

1 Apparatus for electric current application treatment
2 Sample
3 Die (conductive container)
4, 5 Spacer (cover member of the container)
6, 7 Punch electrode
8 Water-cooled vacuum chamber
9 Cooling water passage
10, 16 Water cooling mechanism
11 Pulse current supply
12 Control unit
13 Pressurizing mechanism
14 Position measuring mechanism
15 Atmosphere control mechanism
17 Temperature measuring device

BEST MODE FOR CARRYING OUT THE INVENTION

The present invention is described in detail below with reference to Examples and Comparative Examples. However, the scope of the present invention is not limited to these examples.

EXAMPLE 1

$NiS_2$ powder (mean particle diameter of about 9.2 μm) was added to 0.5% $Ti(SO_4)_2$ aqueous solution so as to provide a atomic ratio of Ni:Ti=95:5, followed by mixing and stirring for about 3 hours. Thereafter, the mixture was dried at 100° C. Sulfur powder (mean particle diameter of about 20 μm) was added to the powder thus obtained to provide an atomic ratio of Ni:S=1:10. The powder mixture was placed in a cylindrical graphite mold (conductive container) having an inner diameter of 15 mm. The cylindrical graphite mold was set in the vacuum chamber 8 of the apparatus for electric current application treatment shown in FIG. 1, the pressure inside the chamber 8 was reduced to about 20 Pa, and then argon gas was introduced until atmospheric pressure was reached.

Next, the graphite mold (conductive container) 3 was sandwiched between the spacers 4 and 5, which serve as the covers of the mold, from the top and bottom, respectively; and the spacers 4 and 5 were pushed against the graphite mold 3 by the top and bottom punch electrodes 6 and 7 at a pressure of about 1.5 MPa. Consequently, the graphite mold (conductive container) 3 was hermetically sealed, and electrical conductivity was provided between the electrodes 6 and 7 and the graphite mold (conductive container) 3.

After that, a pulse current of up to about 1,500 A (ON-OFF direct current having a pulse width of 2.5 milliseconds and a frequency of 29 Hz) was applied to the graphite mold (conductive container) 3 via the electrodes 6 and 7.

The graphite mold was heated at a rate of about 10° C./minute, and reached 800° C. about 1 hour after the start of pulse current application. After maintaining the graphite mold at this temperature for about 10 minutes, the applied electric current was switched off and the pressure was released. Then, the graphite mold was allowed to cool naturally. After cooling the graphite mold to room temperature, the sample was taken out from the mold, obtaining blackish gray powder.

Figure 2:
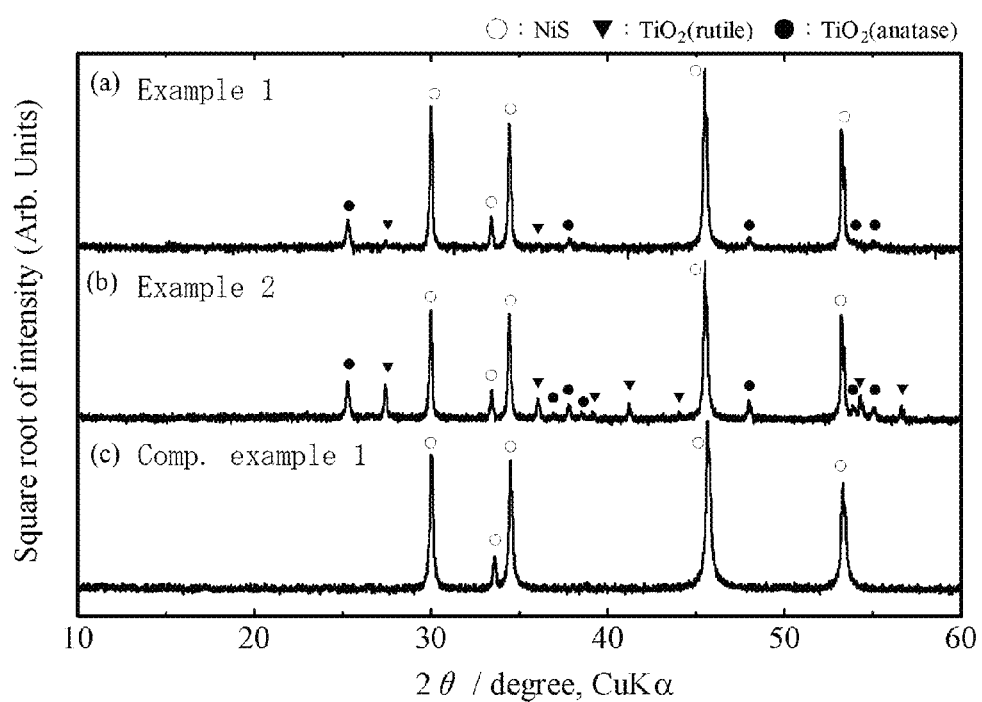
FIG. 2 shows X-ray diffraction patterns of the samples produced in Example 1, Example 2 and Comparative Example 1.

As is clear from powder X-ray diffraction patterns shown in FIG. 2(a), the resulting sample comprises NiS and $TiO_2$ (rutile and anatase). This indicates that NiS is formed by partial elimination of S due to the heat treatment and the NiS coexists with $TiO_2$ in the resulting sample. The lattice constant calculated from the peak position of NiS (space group $P6_3/mmc$) is: a=3.43689 (6) Å, and c=5.35382 (7) Å. This result shows good consistency with the previously reported value of NiS (a=3.4395 (2) Å, c=5.3514 (7) Å) (J. Trahan, R. G. Goodrich, and S. F. Watkins, Phys. Rev. B, 2, 2859 (1970)). Further, according to the results of a Rietveld analysis carried out using a Rietveld analysis program (RIETAN-2000: F. Izumi and T. Ikeda, Mater. Sci. Forum, 321-324, pp. 198-203 (2000)), the abundance ratio of NiS to $TiO_2$ (weight ratio) was 96:4. This corresponds to the atomic ratio of Ni:Ti=95:5; therefore, it can be concluded that the resulting sample maintained the atomic ratio of the starting material.

Figure 3:
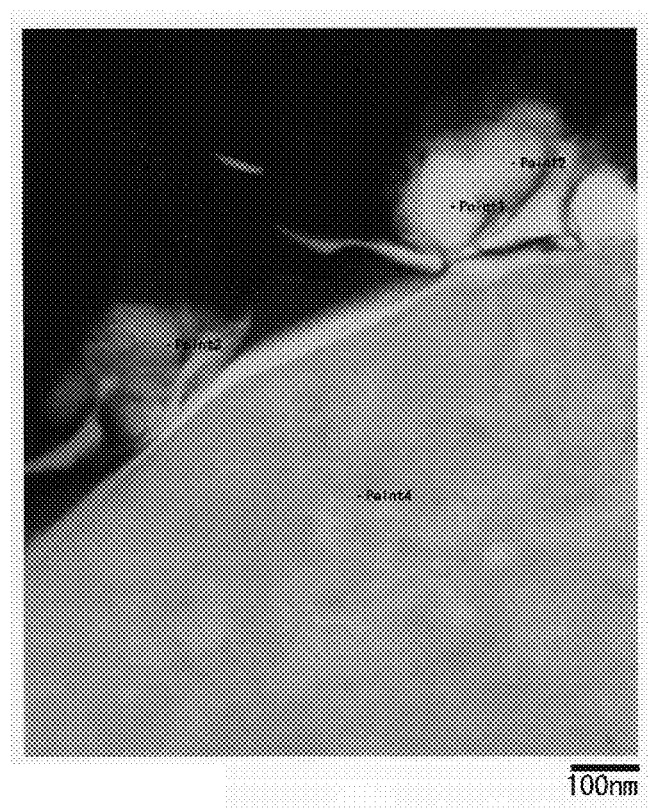
FIG. 3 shows a transmission electron microscope (TEM) picture of the sample produced in Example 1.
Figure 4:
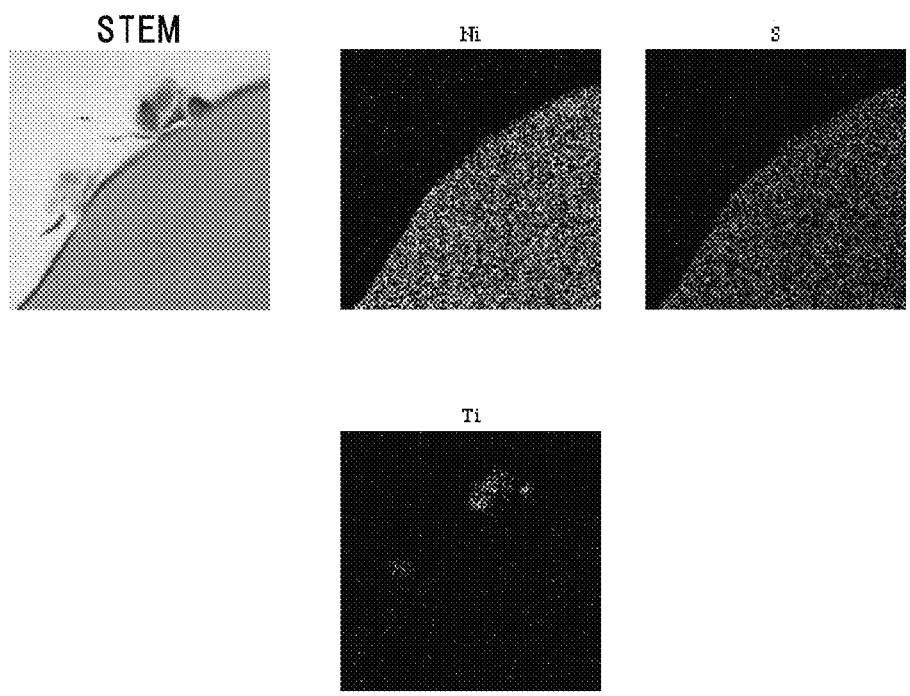
FIG. 4 shows the results of energy dispersive X-ray analysis conducted in the portion shown in FIG. 3 of the sample produced in Example 1.

FIG. 3 shows the transmission electron microscope picture of the resulting sample. FIG. 4 shows the results of the energy dispersive X-ray analysis of the sample. As is clear from FIGS. 3 and 4, $TiO_2$ particles having a particle diameter of about 100 to 200 nm were dispersedly attached on the surface of an NiS particle having a particle diameter of about several microns. This clearly indicates that the composite produced by the method of the present invention was a composite comprising $TiO_2$ dispersedly adhered on the surface of NiS.

Using the thus-obtained sample powder as a positive-electrode material for a lithium secondary battery, a lithium metal as a negative electrode, aluminum mesh as a current collector, and a solution in which $LiPF_6$ was dissolved into a mixed solution of ethylene carbonate and dimethyl carbonate as an electrolyte, Galvanostatic charge/discharge tests were conducted in the cutoff voltage range of 1.0 V to 3.0 V at a current density of 177 mA/g (0.3 C).

Figure 5:
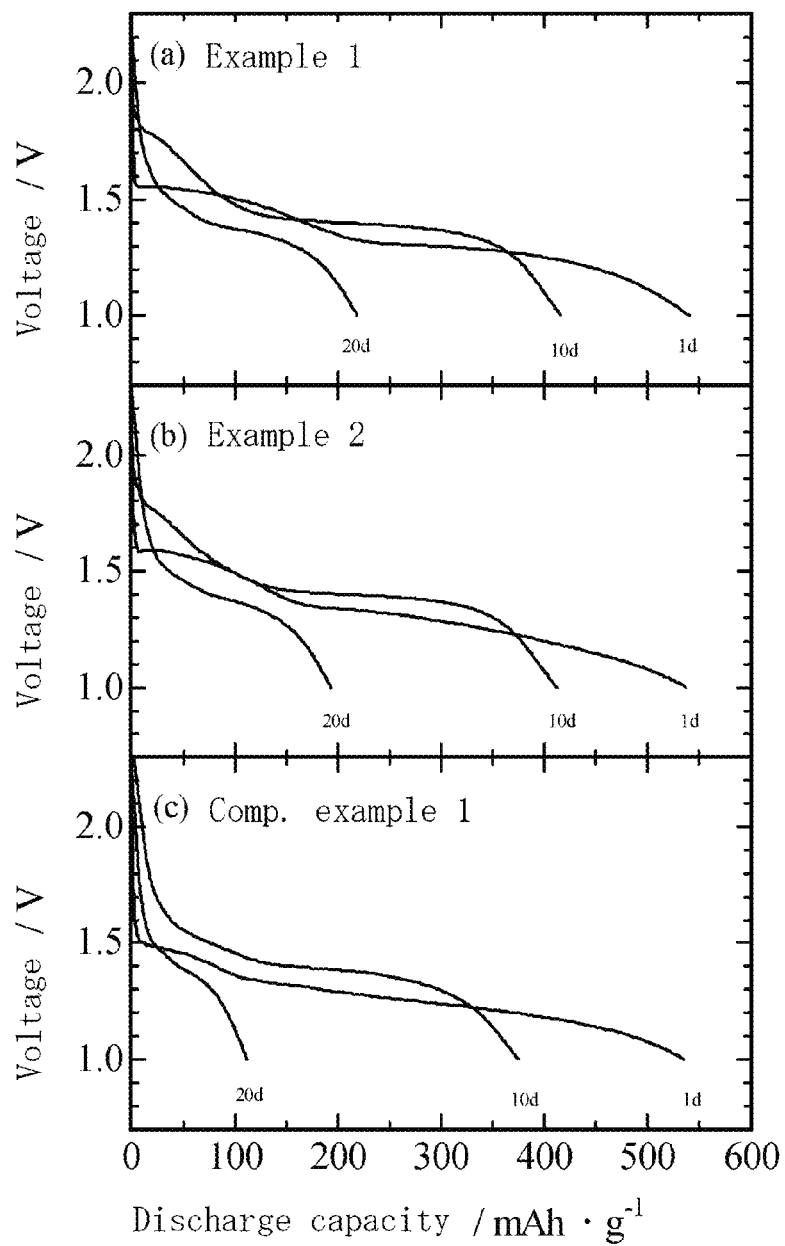
FIG. 5 is a graph showing the discharge performances of the lithium secondary batteries produced in Example 1, Example 2 and Comparative Example 1.
Figure 6:
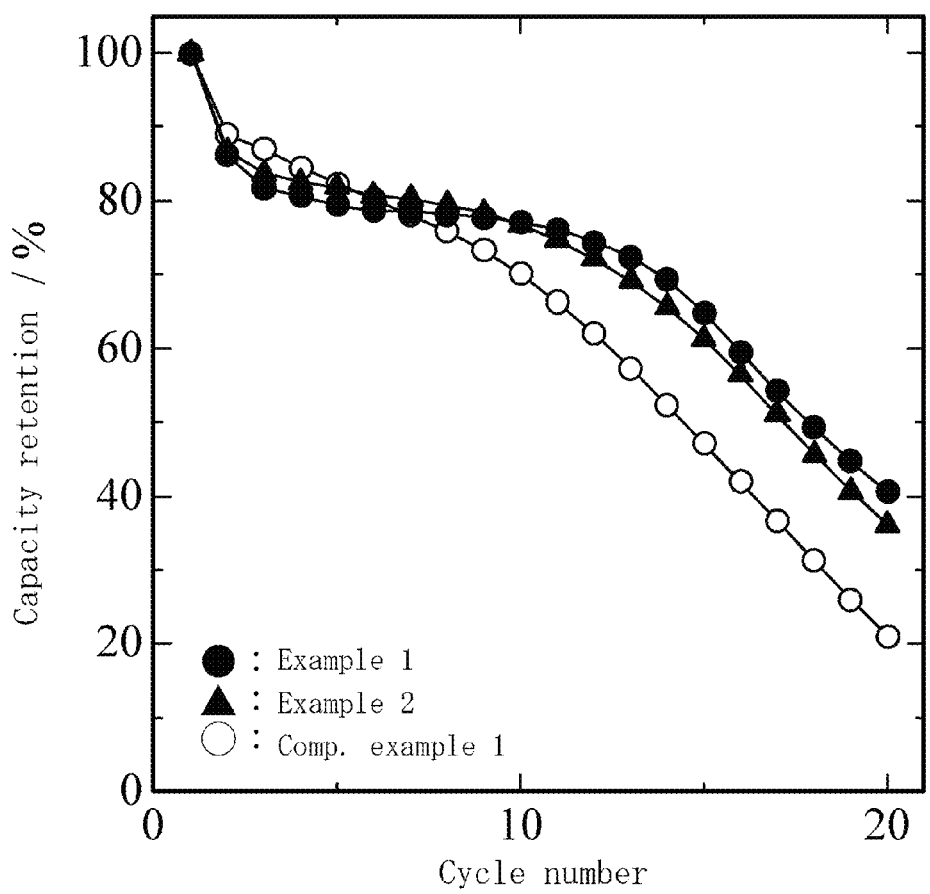
FIG. 6 is a graph showing the capacity retention relative to the initial discharge capacity of the lithium secondary batteries using the samples produced in Example 1, Example 2 and Comparative Example 1.

FIG. 5(a) shows the discharge curve of a lithium secondary battery at 0.3 C. The lithium secondary battery had an initial discharge capacity of about 540 mAh/g, which is almost the same as that of an uncovered lithium secondary battery (Comparative Example 1; about 530 mAh/g). However, the lithium secondary battery of Example 1 had a discharge capacity of about 220 mAh/g after 20 cycles, which was superior to that of the uncovered lithium secondary battery (about 110 mAh/g). The capacity retention after 20 cycles relative to the initial discharge capacity was, as shown in FIG. 6, about 41%, which was remarkably improved compared to that of the uncovered lithium secondary battery (about 21%).

The above shows that the composite of metal sulfide powder partially covered with metal oxide obtained by the production process of the present invention exhibits an improved cycle performances compared to an uncovered composite, and a high capacity; therefore, it can be suitably used as a positive-electrode material for a lithium secondary battery.

EXAMPLE 2

$NiS_2$ powder (mean particle diameter of about 9.2 μm) was added to 2% $Ti(SO_4)_2$ aqueous solution so as to provide a atomic ratio of Ni:Ti=85:15, followed by mixing and stirring for about 3 hours. Thereafter, sulfur powder (mean particle diameter of about 20 μm) was added thereto so as to provide an atomic ratio of Ni:S=1:10, and a thermal reaction was conducted by applying current in the same manner as in Example 1, obtaining blackish gray powder.

As shown in FIG. 2(b), the resulting sample comprises NiS and $TiO_2$ (rutile and anatase). The lattice constant calculated from the peak position of NiS (space group $P6_3/mmc$) is: a=3.43694 (8) Å, and c=5.35476 (10) Å. This result shows good consistency with the previously reported value of NiS (a=3.4395 (2) Å, c=5.3514 (7) Å) (J. Trahan, R. G. Goodrich, and S. F. Watkins, Phys. Rev. B, 2, 2859 (1970)). Further, according to the results of a Rietveld analysis carried out using a Rietveld analysis program (RIETAN-2000: F. Izumi and T. Ikeda, Mater. Sci. Forum, 321-324, pp. 198-203 (2000)), the abundance ratio of NiS to TiO2 (weight ratio) was 87:13. This corresponds to the atomic ratio of Ni:Ti=85:15; therefore, the resulting sample maintained the atomic ratio of the starting material as that obtained in Example 1.

Using this sample powder as the positive electrode material of a lithium secondary battery, a charge-discharge test was conducted in the same manner as in Example 1. FIG. 5(b) shows the discharge curve of a lithium secondary battery at 0.3 C. The lithium secondary battery had an initial discharge capacity of about 540 mAh/g, which is almost the same as that of an uncovered lithium secondary battery (Comparative Example 1; about 530 mAh/g). However, the lithium secondary battery of Example 2 had a discharge capacity of about 190 mAh/g after 20 cycles, which was superior to that of the uncovered lithium secondary battery (about 110 mAh/g). The capacity retention after 20 cycles relative to the initial discharge capacity was, as shown in FIG. 6, about 36%, which was remarkably improved compared to that of the uncovered lithium secondary battery (about 21%).

The above shows that the composite of metal sulfide powder partially covered with metal oxide obtained by the production process of the present invention exhibits an improved cycle performances compared to an uncovered composite, and a high capacity; therefore, it can be suitably used as a positive-electrode material for a high-capacity lithium secondary battery.

COMPARATIVE EXAMPLE 1

Sulfur powder (mean particle diameter is about 20 μm) was added to $NiS_2$ powder (mean particle diameter of about 9.2 μm) so as to provide an atomic ratio of Ni:S=1:10. Thereafter, the mixture was subjected to a thermal reaction by applying current in the same manner as in Example 1, obtaining blackish gray powder.

As shown in FIG. 2(c), the resulting sample consists of NiS. The lattice constant (space group $P6_3/mmc$) calculated from the peak position is a=3.43713 (8) Å, and c=5.34272 (10) Å. This result shows good consistency with the previously reported value of NiS (a=3.4395 (2) Å, c=5.3514 (7) Å) (J. Trahan, R. G. Goodrich, and S. F. Watkins, Phys. Rev. B, 2, 2859 (1970).).

Using this sample powder as the positive electrode material of a lithium secondary battery, a charge-discharge test was conducted in the same manner as in Example 1. FIG. 5(c) shows the discharge curve of a lithium secondary battery at 0.3 C. The lithium secondary battery had an initial discharge capacity of about 530 mAh/g, which is almost the same as those of the composites of metal sulfide and metal oxide obtained in Examples 1 and 2. However, the powder of Comparative Example 1 had a discharge capacity after 20 cycles lower than that of the composites obtained in Examples 1 and 2. The capacity retention after 20 cycles relative to the initial discharge capacity was, as shown in FIG. 6, about 21%, which was remarkably inferior to that of the composites obtained in Examples 1 and 2.

The above results indicate that the sample composed of metal sulfide has a large contact area with the electrolyte and the dissolution of the sulfur component therefrom cannot be suppressed, resulting in a large cycle degradation.

The invention claimed is:

1. A composite of metal sulfide and metal oxide comprising:
   a metal sulfide, which is nickel sulfide, copper sulfide, iron sulfide, or a mixture thereof; and
   a metal oxide, which is a particulate titanium oxide that partially covers the surface of the metal sulfide.

2. The composite according to claim 1, wherein the amount of the metal oxide is 0.01 to 0.5 mol per 1 mol of metal sulfide.

3. A process of producing a composite of metal sulfide and metal oxide of claim 1, comprising the steps of:
   dispersing a metal sulfide, which is nickel sulfide, copper sulfide, iron sulfide or a mixture thereof, in an aqueous solution containing a titanium salt;
   drying the aqueous solution to deposit the titanium salt on the metal sulfide; and heat-treating the metal sulfide comprising titanium salt deposited thereon at 400 to 900° C. in a sulfur-containing atmosphere.

4. The process according to claim 3, wherein the metal sulfide comprising titanium salt deposited thereon is heat-treated in a sulfur-containing atmosphere by placing the metal sulfide comprising titanium salt deposited thereon in a conductive container together with sulfur, and then applying a pulsed direct current to the container in a non-oxidizing atmosphere.

5. A lithium secondary battery positive-electrode material comprising the composite of claim 1.

6. A lithium secondary battery comprising, as a constituent, a lithium secondary battery positive-electrode material comprising the composite of claim 1.

* * * * *